United States Patent [19]
Wood et al.

[11] Patent Number: 5,301,069
[45] Date of Patent: Apr. 5, 1994

[54] NONLINEAR RUGATE OPTICAL LIMITER

[75] Inventors: Gary L. Wood; Wolfgang Elser, both of Fairfax County; Edward J. Sharp, Stafford County, all of Va.

[73] Assignee: The United States of America as represented by the Secretary of the Army, Washington, D.C.

[21] Appl. No.: 336,441

[22] Filed: Mar. 9, 1989

[51] Int. Cl.$^5$ .......................... B05D 3/06; B05D 5/06; G02B 6/34; G01B 9/02
[52] U.S. Cl. ................................... 359/890; 359/359; 359/580
[58] Field of Search ................. 350/1.6, 311, 312-314, 350/166; 359/359, 580, 890

[56] References Cited

U.S. PATENT DOCUMENTS

| | | | |
|---|---|---|---|
| 4,198,162 | 4/1980 | Bjorklund et al. | 356/349 |
| 4,583,818 | 4/1986 | Chen et al. | 350/96.19 |
| 4,707,611 | 11/1987 | Southwell | 356/382 |
| 4,819,239 | 4/1989 | Sharp et al. | 350/166 |
| 4,826,286 | 5/1989 | Thornton | 350/166 |
| 4,837,044 | 6/1989 | Muraka et al. | 427/162 |

OTHER PUBLICATIONS

Baumeister, P.; Simulation of a Rugate Filter...; Aug. 15, 1986, Appl. Opt., vol. 25, #16, pp. 2644-2645; abst. only supplied.

Zukie et al; Optical Coatings with Graded...; Jan. 13, 1988, Proc. SPIE., L.A. Calif., vol. 895, pp. 271-277; abst. only.

Bovard, B. C.; Derivation of a Matrix... Thin Film; May 15, 1988, Appl. Opt., vol. 27, #10, pp. 1988-2005; abst. only.

Bovard, et al; Nonlinear Behavior... Irradiation; J. M. Opt., vol. 35, #7, pp. 1151-1168, Jul. 1988; abst. only.

Primary Examiner—Nelson Moskowitz
Attorney, Agent, or Firm—John E. Holford; Milton W. Lee; Anthony T. Lane

[57] ABSTRACT

The present invention provides layered polymeric media to control the spatial and spectral distribution of energy in optical beams, particularly high intensity, broadband, multi-line laser beams. This structure is an improved version of prior art thin-film (vaccum deposited) interference filters and "rugate" structure filters.

9 Claims, 2 Drawing Sheets

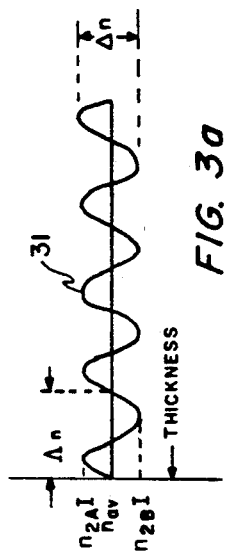
FIG. 3a
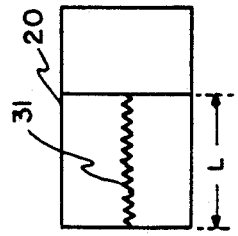
FIG. 3b
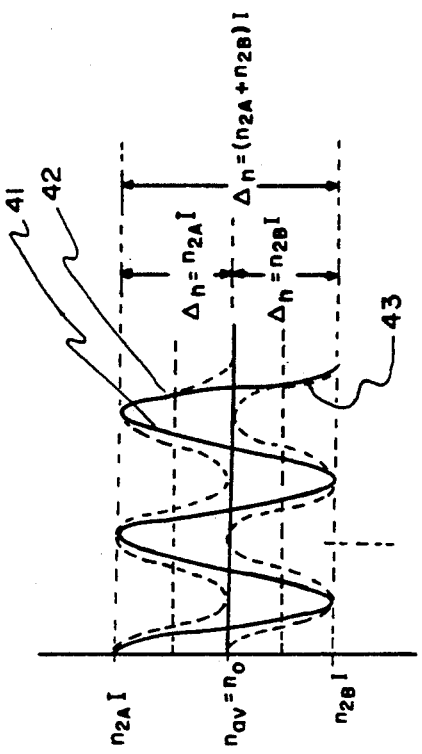
[1] $\lambda_{reject} = 2 n_{av} \Lambda_n$
[2] $\dfrac{\Delta \lambda}{\lambda} = \dfrac{2}{\pi} \dfrac{\Delta n}{n_{av}}$
[3] $OD \simeq \left(\dfrac{\Delta \lambda}{\lambda}\right) \ell + \log(4/n_s)$
FIG. 3c
FIG. 4
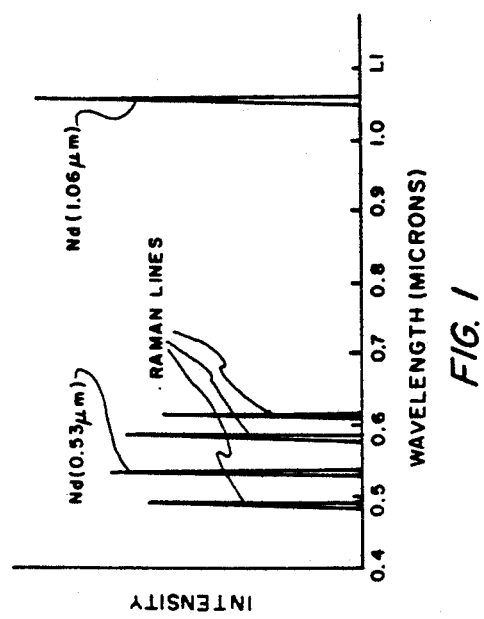
FIG. 1
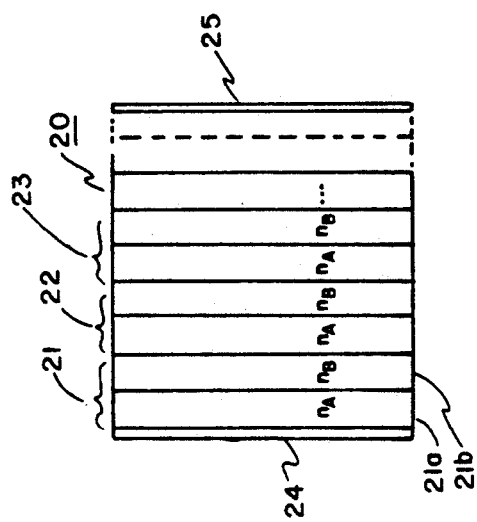
FIG. 2

NONLINEAR RUGATE OPTICAL LIMITER

The invention described herein may be manufactured, used, and licensed by the U.S. Government for governmental purposes without the payment of any royalties thereon.

BACKGROUND OF INVENTION

1. Field

This invention relates to light limiters which protect optical detectors or sensors (including eyes). It is well known that unprotected optical sensors can be damaged by exposure to intense laser radiation. Protectors or optical limiters may be of two general types, active or passive. Active optical limiters require a predetermination of the presence of threat radiation and then must provide an external stimulus (such as an applied electric field) to operate the limiter. Active devices are usually complex (tunable filters for example) and are unable to respond to short pulses or bursts of harmful radiation. Passive protectors are preferred since the threat radiation itself triggers the desired protective response.

An ideal protector must fulfill various requirements: it must not degrade or attenuate desired radiation (low insertion loss); it must provide complete blocking of radiation above some predetermined detector damage threshold (harmful to the sensor or eyes), it must be sensitive over a sufficiently wide wavelength range to block all undesired radiation, it must have a wide field-of-view, it must (in many cases) be fast acting, and it must be capable of simultaneously blocking a multiplicity of intense laser wavelengths emanating from a single source.

Of late, there has been considerable interest in protecting sensors and eyes from high-power multi-line laser sources (directed energy) which are currently under development. The basic design of such lasers include a neodyminum-doped laser host material such as glass or yttrium aluminum garnet (YAG). The fundamental output wavelength of such lasers is at 1.05 to 1.06 micrometers depending on the particular laser host material. This fundamental wavelength is frequency doubled (wavelength is halved) to approximately 0.53 micrometers and the beam at this wavelength is used to pump a Raman cell which, in turn, emits several additional laser frequencies which are typically at several hundreds of Angstroms from the pump wavelength. These laser systems (known as "rainbow" or "white light" lasers) are designed to deliver all of these laser lines simultaneously. That is, four or five laser lines at different wavelengths (each are separated by several hundered angstroms in the visible spectrum) will arrive at a targeted sensor simultaneously. In addition, the multiplicity of laser wavelengths (each at substantial intensity) are capable of being delivered to the system in short pulses (10 nanoseconds) at a repetition rate of 10 Hz or in a number of random delivery rates.

2. Prior Art

This threat poses a serious problem for existing sensor-protection technology. Fixed-line filters are not viable solutions since the exact wavelengths of the Raman shifted 0.53 micrometer pump laser are uncertain and could even be changed during operation of the laser. Another drawback of fixed-line filters for so many laser lines is the large insertion loss. This particular problem applies to state-of-art "rugate filters" as well, that is, if more than three rejection wavelengths are designed into the filter, the overall transmission of the filter is seriously degraded which in turn impaires the sensor mission. Tunable filters are not capable of countering such a threat for two reasons: they cannot respond to nanosecond pulses and they cannot filter a multiplicity of laser lines simultaneously.

An object of the present invention is to overcome these problems and provide passive broadband sensor protection against high-intensity, short-pulse, high repetition rate multi-line lasers. The teachings of the invention can be used to passively protect night-vision devices, sensitive photodetectors and eyes.

SUMMARY OF THE INVENTION

Certain optical-quality materials, including polymers and semiconductors, have been found to exhibit relatively large third-order optical susceptibilities. The present invention seeks to exploit these third order susceptibilities to provide filters that automatically change frequency characteristics at different radiation levels. Two embodiments of the limiting device are given: a thin-film limiting structure when one incident laser frequency is known, and a Raman activated thin-film limiting structure when none of the incident frequencies are known. Both embodiments make use of the thin film technology described in a prior application Ser. No. 046,329 titled "Laser Q-Switch", filed: May 6, 1987, now U.S. Pat. No. 4,819,239.

BRIEF DESCRIPTION OF THE DRAWINGS

The invention is best understood with reference to the accompanying drawings wherein:

FIG. 1 shows a generalized graph of the laser emmission as a function of wavelength for a typical multi-line laser system based on Raman shifted, doubled, Nd:YAG radiation;

FIG. 2 shows a thin-film filter structure according to the present invention using alternating films of different optical material having nonlinear refractive indices.

FIGS. 3a and 3b show generalized graphs of the index of refraction (where $n_{2B}<0$) indicating the spatial modulation as a function of device-structure thickness and the appropriate relationships describing the filter characteristics;

FIG. 3c shows the algorithms which define the filter characteristics;

FIG. 4 shows three generalized curves for illustrating different index-modulation profiles suitable for FIG. 2 devices;

DESCRIPTION OF THE PREFERRED EMBODIMENT

Figure 5:
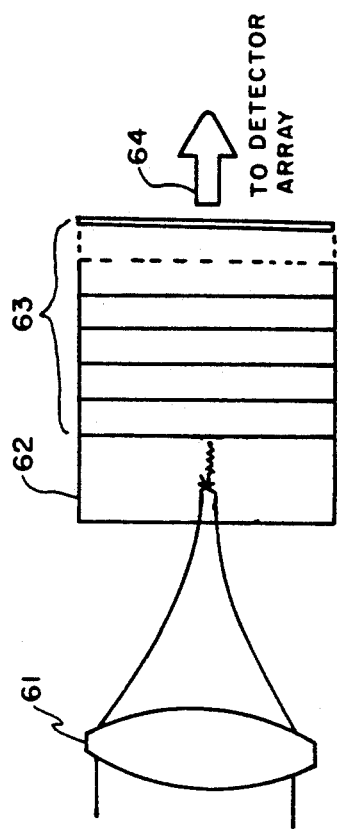
FIG. 5 shows a generalized graph of light reflection from a FIG. 2 device as a function of wavelength both "before" and "during" exposure to intense laser radiation.

The thin film structures of the invention are nonlinear rugate structures having multiple layers of materials with large third order optical susceptibilities on the order of a molecule thick. Nonlinear rugate structures can be evaluated by using the same techniques that are applied to linear rugate structures. The only difference being that the rejection bandwidth of the nonlinear rugate structure is proportional to an intensity-dependent index-of-refraction-change $\Delta n$. In normal linear rugate structures the continuous spatial modulation of the index of refraction (n) is derived entirely from the first-order susceptibility or linear indices of refraction. In these structures the rejection wavelengths and bandwidths are designed at fixed values and $\Delta n$ is constant. Nonetheless, $\Delta n$ is still proportional to the rejection bandwidth, which means the rejection bandwidth is constant. In addition, since the difference in index of refraction among polymers is usually small, at intensities above the previously mentioned damage threshold, the $\Delta n$'s possible in linear rugates are also small and consequently lead to a narrow rejection-band limiter structure. Such narrowband devices comprised the basis of a previous disclosure (Laser Q-Switch, filed May 6, 1987; Ser. No. 046,329) now U.S. Pat. No. 4,819,239 issued Apr. 4, 1989. If materials other than polymers are used in rugate filter structures (e.g., dielectrics which are vacuum deposited) the $\Delta n$'s possible need not be small so the rejection bandwidth can be large but the rejection wavelength is fixed in these devices.

FIG. 1 shows a representative group of wavelengths generated by the YAG laser previously mentioned. These will include the fundamental at 1.06 micrometers, the doubled frequency at 0.53 micrometers and perhaps two or three Raman lines at 0.49 micrometers (anti-Stokes), and at 0.57 and 0.61 micrometers (Stokes). The wavelengths given for the Raman lines are only to illustrate their approximate spectral positions relative to the doubled frequency at 0.53 micrometers. The actual values of the Raman lines will depend on the Raman material selected for use in the laser system. To protect detectors from all these frequencies nonlinear rugate filters can be designed in several different ways depending on the seldction of materials available and the desired wavelength range of the structure.

FIG. 2 shows a particularly advantageous thin film filter structure which can be made using conventional molecular beam epitaxy (MBE) or Langmuir-Blodgett (LB) techniques depending on the materials selected for the filter construction. Suitable materials are semiconductors, liquid crystal matrices and polymers; the latter being most suitable for (LB) processing. The filter 20 consists of a plurality of pairs 21, 22, 23, etc. of films such as 21a and 21b, the thickness of which can be routinely controlled using the MBE or LB fabrication techniques. The linear susceptibilities (and hence the linear index of refraction $n_o$) of the layers in each pair are the same so that for low-intensity radiation below the filter appears as a completely transparent element. Broadband anti-reflection coatings 24 and 25, respectively, are applied to the entrance and exit faces to reduce the Fresnel-reflection losses of the device. Only the third-order or intensity dependent susceptibilities (hereafter referred to as the nonlinear indices of refraction $n_{2A}$ and $n_{2B}$) of the layers 21a and 21b, respectively, in each pair are different and are intensity (I) dependent. A high/low interference filter is constructed using the nonlinear indices of refraction and the proper layer thicknesses and number of layers to position a reflection band at some desired optical frequency. The film thickness can be a quarter wavelength at this desired optical frequency, but it is preferred that the thickness be derived on the basis of a computation as described in the article "OPTICAL THIN FILMS SYNTHESIS PROGRAM BASED ON THE USE OF FOURIER TRANSFORMS" by J. A. Dobrowolski and D. Lowe in Applied Optics, Vol. 17, No. 19, Oct. 1, 1978, P 3039-3050. In these computations one would use the total indices of refraction for the two nonlinear materials given in FIG. 2 as $n_A = n_o + n_{2A}I$ and $n_B = n_o + n_{2B}I$. This technique leads to layered nonlinear rugate structures wherein there are no abrupt changes in the high-intensity indices of refraction which might lead to local heating and filter distortion or to a separation of layers because of mismatched thermal expansion coefficients. Indices $n_{2A}$ and $n_{2B}$ are nonlinear indices of refraction and play a role only at high intensity levels, so their effects will be observed only at irradiation levels achieved by lasers. For low intensity (i.e., non-laser light) the device of FIG. 2 is completely transparent, since at low intensities it has an index of refraction $n_o$ which is just the linear index of refraction and $n_o$ is the same for all layers and the substrate.

FIGS. 3a and 3b show the relationship of the various index of refraction components and their role in the performance of filter 20. Since the high-intensity contribution to the total index of refraction can vary widely from material to material (i.e. $n_{2A}$ or $n_{2B}$ could be zero) depending on the optical nonlinearity producing the index change, it becomes convenient to define an average index of refraction ($n_{av}$). In addition, the important filter performance parameters, such as the optical density, rejection wavelength(s), and rejection bandwidth, are defined in terms of the index change $\Delta n$ and the average index. Curve 31 is a generalized graph of the index of refraction showing a possible spatial modulation of the index in the x-direction (film-thickness direction) about an average index of refraction $n_{av}$. Here the period of the index modulation is given as $\Lambda n$, and is related to the rejection wavelength $\lambda_{reject}$ by the following expression also given in FIG. 3c;

$$\lambda_{reject} = 2n_{av} \Lambda n \qquad [1]$$

It is important to note here that the index modulation period is fixed during the fabrication process so that $\Lambda n$ is equal to the thickness of the filter structure L divided by the number of index cycles or periods, l, or $\Lambda_n = L/l$. The total peak-to-peak amplitude of the index modulation about $n_{av}$ defines the total change in the index of refraction $\Delta n$.

FIG. 4 shows a series of generalized curves which demonstrate the effects of variation in the index-of-refraction modulation as a function of thickness. Here the indices are shown with a sinusoidal variation as a function of film thickness, but the actual variation for a particular film design will be predicted by the method described by Dobrowolski et al. cited above. Using the indices $n_A$ and $n_B$ defined earlier three separate cases are shown here: $n_{2A} = 0$, $n_{2B} = 0$ and both nonlinear indices not equal to zero. The effects of these different index variations can be understood by examining the expression, also found in FIG. 3c, for the spectral bandwidth of the rejection wavelength;

$$\frac{\Delta \lambda}{\lambda} = \frac{2 \Delta n}{\pi n_{av}} \qquad [2]$$

Note that for the three cases shown only curve 41 has a constant $n_{av} = n_o$ so that, from expression [1], the rejection wavelength remains fixed at the design wavelength (requires that $n_{2A} = -n_{2B}$). Both curves 42 and 43 have intensity-dependent average indices $n_{av}$ and the rejection wavelength will shift with increasing intensity. This feature provides flexibility in the filter design as will be pointed out below. The key design parameter controlling the spectral bandwidth of the filter is the index-of-refraction change $\Delta n$. For curve 41 the index change is intensity dependent so that the bandwith broadens as the intensity increases. For index changes approaching unity, the bandwidth approaches the design wavelength in width, i.e., for a design wavelength of 0.5 micrometers the bandwidth approaches 0.5 micrometers. This bandwidth expansion then allows the limiter to reflect the 0.53 micrometer laser line as well as all the Raman generated lines which might be present. A "spike" filter at 1.06 micrometers or a broadband high-reflectance coating can be applied to any of these structures to eliminate the original 1.06 micrometer laser line. Another alternative for removing the 1.06 micrometer line is to design a nonlinear rugate at this wavelength and use it in conjunction with one or more other nonlinear rugate limiters.

FIG. 5 shows a series of generalized curves indicating the performance characteristics of a limiter structure with $n_{2A} = -n_{2B}$. The dot-dash curve denotes the constant $n_o$ at $I_o$ or normal intensity for a viewer. A design wavelength of 0.53 micrometers is used for this limiter. Note that the spectral bandwidth $\Delta \lambda$ (solid line) broadens with intensity ($I_1 < I_2 < I_3$) but the spectral position remains fixed at the design wavelength. From expression [2] above it can be seen that for $\Delta n$'s approaching unity the spectral bandwidth $\Delta \lambda$ approaches the design wavelength in width (here $\lambda_{reject} \sim 0.53$ micrometers).

The optical density (OD) of this structure is defined by the FIG. 3c expression;

$$OD \sim \{\Delta\lambda/\lambda\}l + \log(4/n_s) \quad [3]$$

where $n_s$ is the index of refraction of the substrate material supporting the thin-film nonlinear rugate structures. The key parameters affecting the OD of the structure are the change in index $\Delta n$ and the number of index cycles l.

The limiter design described above keeps the design wavelength fixed and lets the bandwidth expand uniformly about this wavelength. This allows the limiter to effectively remove laser lines both above and below the design wavelength. This behavior results directly from the fact that the average index of refraction $n_{av}$ is independent of the intensity. Note that, in general, $n_{2A}$ is not equal to $n_{2B}$ and that, in the extremes, either could be zero. Curves 42 and 43 from FIG. 4 show the modulation of the index of refraction for the cases where $n_{2A} = 0$ and $n_{2B} = 0$ respectively. The average index for these two cases is intensity dependent and will result in a shift of the central wavelength of the limiter-bandwidth expansion, as indicated by dashed curves in FIG. 5. This feature allows considerable flexibility in the limiter design.

Note that large changes in $\Delta n$ are easily achieved in resonant nonlinear interactions. Resonant nonlinearities are usually associated with absorption. This is not a serious problem for the design of the limiter structures described here. In the first embodiment, described above, one of the incident laser frequencies is known to be 0.53 micrometers; so (if a resonant nonlinearity must be used to obtain the desired limiter bandwidth) at best there would be only a single absorption line to cause insertion losses.

Figure 6:
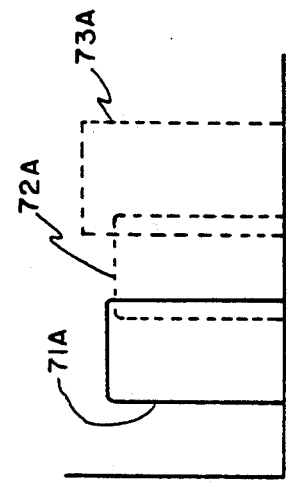
FIG. 6 shows the filter structure of FIG. 2 and the means to supply at least one known laser frequency to the structure.

FIG. 6 shows a second embodiment of the limiter which is particularly effective in a viewing system with an intermediate focal point. Such a system may be provided with a means for supplying a known laser line to activate the bandwidth expansion and/or shift as desired. In this embodiment the limiter structure 63 is positioned in the optical path behind a Raman cell 62 with a known output. The nonlinear rugate structure is designed to "trigger" on one of the Raman lines emmitted from the cell, preferably the first stokes shifted line. Laser light superimposed on the incoming incident radiation in the form of a threat is focused by a lens 61 of the optical system into the Raman cell. A set of new laser lines is generated through stimulated Raman scattering and one or more of these lines can be used as the design wavelength of the nonlinear rugate structure. In the absence of laser illumination the normal illumination of the scene being viewed passes through the system to a sensitive detector array as indicated by arrow 64.

Figure 7A:
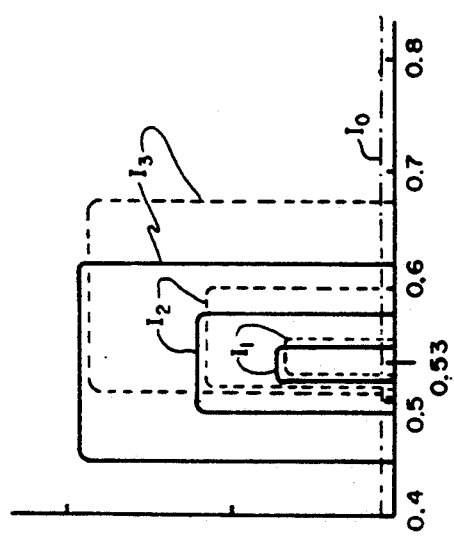
FIG. 7 shows an arrangement of FIG. 2 thin-film filter structures to increase the spectral bandwidth of the device.
FIG. 7b shows typical rejection bands for three limiters.
Figure 7B:
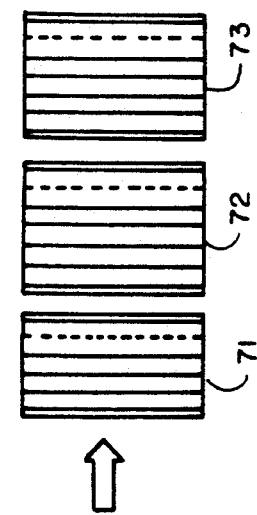

FIG. 7 shows a cascade of nonlinear rugate limiters 71, 72 and 73 of a FIG. 2 design to effectively expand the wavelength coverage of the device. Here three laser lines of the Raman insert of FIG. 6 are used as the design wavelengths for the three individual limiter elements so that when "triggered" they compliment one another and provide complete coverage of a wide spectral bandwidth. FIG. 7b shows typical rejection bands 71a, 72a and 73a, respectively for the three limiters in FIG. 7a.

We claim:
1. An optical limiter comprising:
   a first series of thin superposed layers, all having the same first order susceptibility to electric polarization and all being transparent to light over a broad spectrum of wavelengths;
   adjacent layers of said series consisting of materials with electric polarizabilities differing only in their intensity dependent third order susceptibilities to define a first narrow band filter, having an intensity threshold, within said broadband spectrum, such that said limiter reacts to any activating light component within said narrow band which has an intensity above said threshold by reflecting all light components within said narrow band and expanding the width of said narrow band in proportion to the intensity of said activating component.
2. A limiter as set forth in claim 1, further including:
   at least a second series of layers having a slightly different combination of thicknesses and third order susceptibilities than said first series to provide a second narrow band reflection filter for a high intensity frequency component outside said first narrow band and within said broad band.
3. A limiter as set forth in claim 1 wherein:
   said intensity dependent susceptibilities have the same sign but different magnitudes.
4. A limiter as set forth in claim 1 wherein:
   said intensity dependent susceptibilities have opposite signs.
5. A limiter as set forth in claim 1 wherein:
   one of said third order susceptibilities is zero.
6. A limiter as set forth in claim 1 wherein:
   said series of layers includes a Raman cell attached to the input face thereof and the series provides a central frequency of said filter which coincides with an emission line of said cell.

7. A limiter as set forth in claim 6 wherein:
said intensity dependent susceptibilities have the same sign but different magnitudes.

8. A limiter as set forth in claim 6 wherein:
said intensity dependent susceptibilities have opposite signs.

9. A limiter as set forth in claim 6 wherein:
one of said third order susceptibilities is zero.

* * * * *